United States Patent [19]

Ai et al.

[11] Patent Number: 5,633,715
[45] Date of Patent: May 27, 1997

[54] CENTROID APPROACH FOR ESTIMATING MODULATION PEAK IN BROAD-BANDWIDTH INTERFEROMETRY

[75] Inventors: Chiayu Ai; Erik L. Novak, both of Tucson, Ariz.

[73] Assignee: Wyko Corporation, Tucson, Ariz.

[21] Appl. No.: 446,019

[22] Filed: May 19, 1995

Related U.S. Application Data

[63] Continuation-in-part of Ser. No. 247,065, May 20, 1994, Pat. No. 5,471,303.

[51] Int. Cl.$^6$ .................................................. G01B 11/00
[52] U.S. Cl. ........................... 356/359; 356/357; 356/360
[58] Field of Search .................................. 356/359, 360, 356/357

[56] References Cited

U.S. PATENT DOCUMENTS

| | | | |
|---|---|---|---|
| 4,340,306 | 7/1982 | Balasubramanian | 356/360 |
| 4,387,994 | 6/1983 | Balasubramanian | 356/360 |
| 4,670,646 | 6/1987 | Spivey | 356/354 |
| 4,690,562 | 9/1987 | Davies et al. | 356/361 |
| 5,204,734 | 4/1993 | Cohen et al. | 356/359 |
| 5,341,213 | 8/1994 | Giroux | 356/356 |
| 5,516,608 | 5/1996 | Hobbs et al. | 356/357 |

OTHER PUBLICATIONS

Davidson et al., "First Results of a Product . . . ," SPIE. vol. 921, 1988, pp. 100–114.

Dresel et al., "Three–Dimensional Sensing . . . ," Applied Optics, vol. 31, No. 7, Mar. 1, 1992, pp. 919–925.

Danielson et al., "Absolute Optical Ranging . . . ," Applied Optics, vol. 30, No. 21, Jul. 20, 1991, pp. 2975–2979.

De Groot et al., "Three–Dimensional Imaging . . . ," Optics Letters, vol. 18, No. 17, Sep. 1, 1993, pp. 1462–1464.

Kino et al., "Mirau Correlation Microscope," Applied Optics, vol. 29, No. 26, Sep. 10, 1990 pp. 3775–3783.

Caber et al., "A New Interferometric . . . ," SPIE, vol. 2088, 195–203, 1993.

*Primary Examiner*—Frank Gonzalez
*Assistant Examiner*—Jason D. Vierra Eisenberg
*Attorney, Agent, or Firm*—Antonio R. Durando

[57] ABSTRACT

A broad-bandwidth interferometric system that produces irradiance signals at multiple vertical-scanning positions as a function of optical path differences between a test and a reference surface. The effective peak of the envelope defined by the modulation component of the irradiance signal is estimated by finding the scanning position corresponding to the centroid of a function substantially equal to the square of the first-order derivative of the measured irradiance. The surface height at each pixel is determined directly from digital irradiance signals, thereby greatly reducing the data-processing steps and associated costs taught by the prior art and correspondingly simplifying the hardware requirements of the system for rapid on-line display of height measurements. The approach is free of the ambiguities inherent in multi-peak modulation functions, thereby producing surface maps with reduced artifacts. This improved technique produces results otherwise comparable with those obtained by standard techniques and requires no dedicated hardware for rapid on-line applications.

17 Claims, 6 Drawing Sheets

CENTROID APPROACH FOR ESTIMATING MODULATION PEAK IN BROAD-BANDWIDTH INTERFEROMETRY

RELATED APPLICATIONS

This is a continuation-in-part application of commonly-assigned U.S. Ser. No. 08/247,065, filed on May 20, 1994, issued on Nov. 28, 1995, as U.S. Pat. No. 5,471,303.

BACKGROUND OF THE INVENTION

1. Field of the Invention

This invention is related in general to the field of vertical-scanning interferometry and, in particular, to a novel approach for deriving surface-profile measurements from irradiance modulation signals.

2. Description of the Related Art

Vertical scanning interferometry (VSI) is a technique where broad bandwidth light, such as white light, is used as a light source in an interferometer and the degree of modulation, or coherence, of interference fringes produced by the instrument is measured for various distances between a test surface and the reference surface of the interferometer (each corresponding to a different optical path difference, OPD) to determine surface height. The method typically involves vertical scanning of the reference arm of the interferometer with respect to a stationary sample and calculation of the relative modulation of the intensity signal as a function of vertical position.

Figure 1:
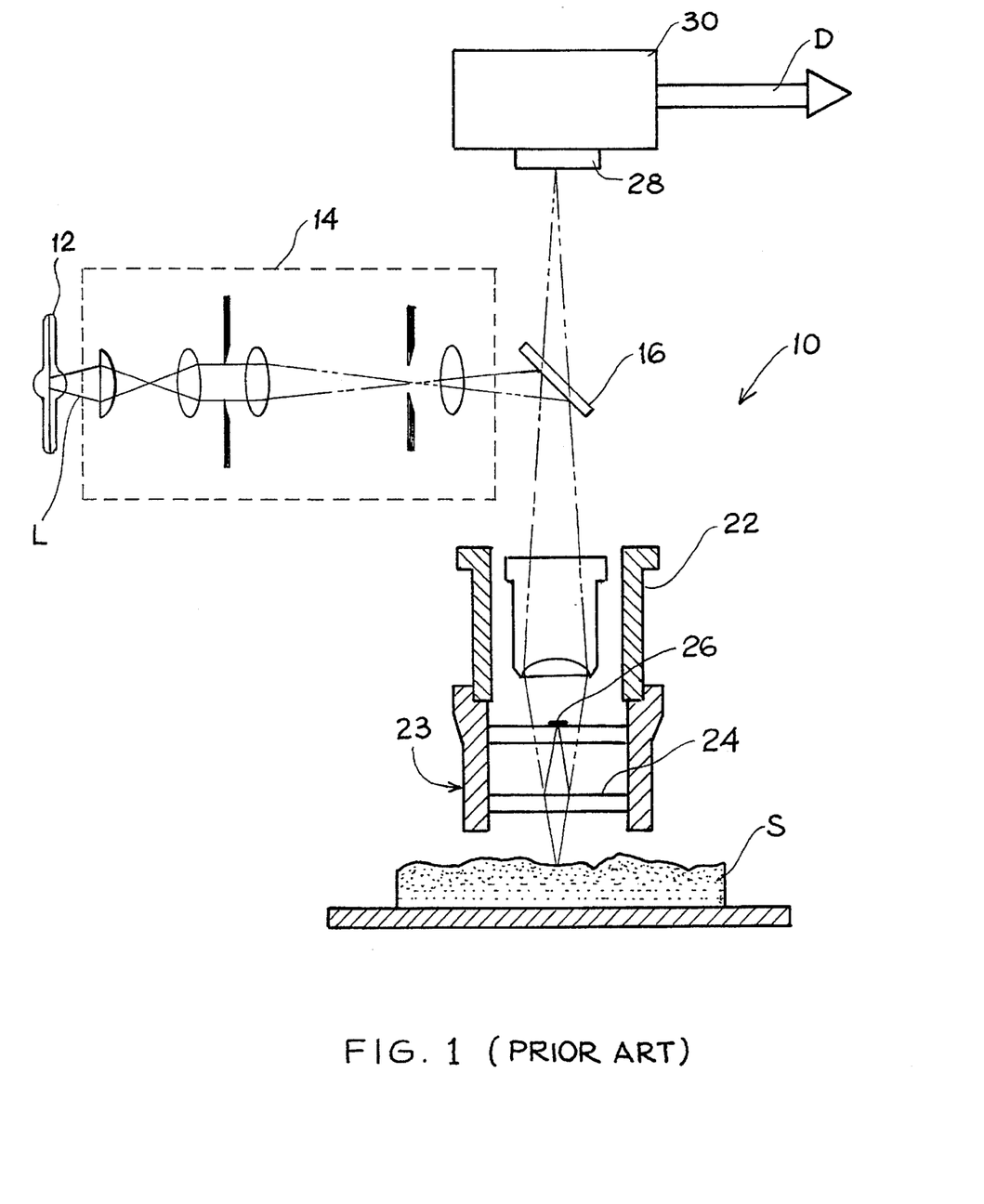
FIG. 1 is a simplified schematic representation of a conventional interference microscope.

As illustrated in simple schematic form in FIG. 1 and described in further detail in U.S. Pat. No. 4,340,306 and U.S. Pat. No. 5,204,734, herein incorporated by reference, typical vertical scanning interferometric equipment 10 comprises a light source 12 directing a beam L of light through an illuminator 14 toward a beam splitter 16, which reflects the light downward in the direction of a test surface S. The light reflected by the beam splitter 16 passes through a microscope objective 22 focused on the test surface S. The objective incorporates an interferometer 23, such as Mirau, comprising a beam splitter 24 and a reference mirror 26 adapted for relative movement with respect to the test surface, so that two light beams are generated for producing interference fringes. The beams reflected from the reference mirror 26 and the test surface S pass back up through the optics of the microscope objective 22 and upward through the beam splitter 16 to a solid-state detector array 28 in a camera 30 in coaxial alignment with the objective 22, so that two light beams produce interference fringes as a result of the optical path difference between the reference mirror and the test surface S. The imaging array 28 normally consists of individual charge-coupled-device (CCD) cells or other sensing apparatus adapted to detect and record a two-dimensional array of signals corresponding to interference effects produced by the interferometer as a result of light reflected at individual x-y-coordinate pixels in the surface S and received at corresponding individual cells in the array. Appropriate electronic hardware is provided to process the signals generated by each cell and transmit digitized light-intensity data D to a microprocessor for processing. The microscope objective 22, as well as the interferometer typically incorporated within it, is adapted for vertical movement (along the z coordinate) to focus the image of the test surface on the detector array 28. Thus, an interference-fringe map is generated by detecting the intensity of the light signal received in each cell of the array 28.

In vertical scanning interferometry, a profile of the surface S is produced by repeating irradiance measurement at different, normally constant-interval OPD's between the objective 22 and the test surface S (that is, at different elevations of the scanning mechanism), so as to provide information concerning the variation of light intensity at each pixel as the corresponding optical path difference is varied systematically with respect to an initial reference point. Thus, the position of the scanning mechanism corresponding to maximum interference at each pixel is determined and used, based on the distance from the reference point, to calculate the height of the surface at that pixel. Either the objective 22 or the test surface S is moved vertically to produce these repeated measurements (vertical scanning). It is noted that the present description is based on the configuration of a Mirau interferometer but, as one skilled in the art would readily understand, it is equally applicable to any of the other instruments used in vertical scanning interferometry, such as Michelson, Linnik or Fizeau.

The prior art discloses various ways by which VSI may be implemented to determine surface height by calculating the degree of fringe modulation, or coherence, of the interference fringes produced at the light detector for various OPD's between the test surface and the reference surface of the interferometer. All methods involve vertical scanning of the reference arm of the interferometer with respect to a stationary sample, or viceversa, and estimation of the vertical position corresponding to the peak of the modulation envelope from the intensity measurements collected during scanning.

Figure 2:
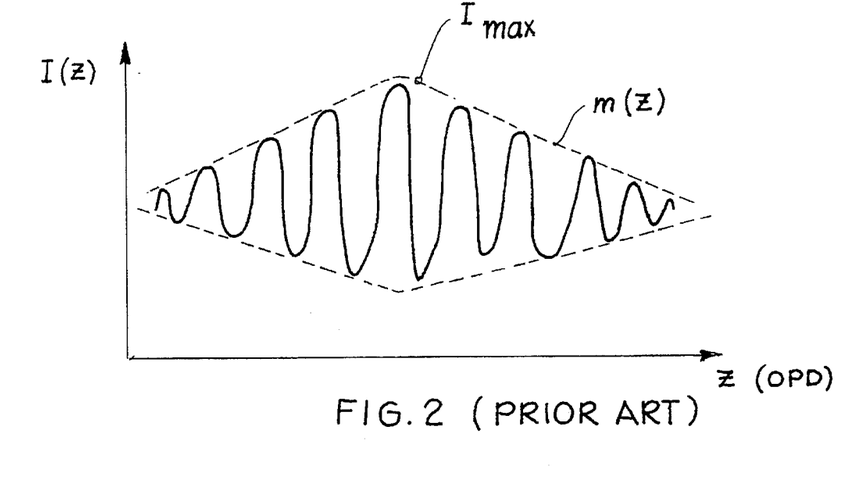
FIG. 2 is a plot of a typical irradiance signal obtained from a detector cell in the image plane of an interferometer as the OPD is varied by vertically scanning the reference mirror or the test sample.

When white light or broad-bandwidth light is used as the source of illumination in an interference microscope, the visibility of the fringes drops off rapidly from its maximum value at minimum OPD. FIG. 2 shows the modulation of a typical intensity signal I (irradiance) obtained from a detector cell in the image plane of the interferometer as the OPD is varied by vertically scanning the reference mirror (or the sample). A measurement of relative surface height at the vertical-scanning point corresponding to the fringe-visibility peak (also maximum fringe contrast) can thus be made. By simultaneously carrying out the procedure in parallel for each detector cell during vertical scanning, a three-dimensional height map can be obtained for the surface of the test sample.

In order to estimate the point of maximum fringe visibility from irradiance data, the amplitude-modulated carrier signal of FIG. 2 is demodulated and the scanning position corresponding to the modulation peak is calculated using one of several techniques. The detector array receives an amplitude-modulated input signal for the light intensity I, as illustrated in FIG. 2, which is given by:

$$I(z)=I_o+m(z)\cos(\omega_o z+\alpha), \qquad (1)$$

where $I(z)$ is the light intensity at the detector, $I_o$ is the constant bias component of the signal (also known as the DC component), $m(z)$ is the modulating signal, $\omega_o$ is the fringe signal, and $\alpha$ is the initial phase, which is assumed constant with respect to the vertical dimension z (the scanning coordinate producing a variable OPD).

Figure 3:
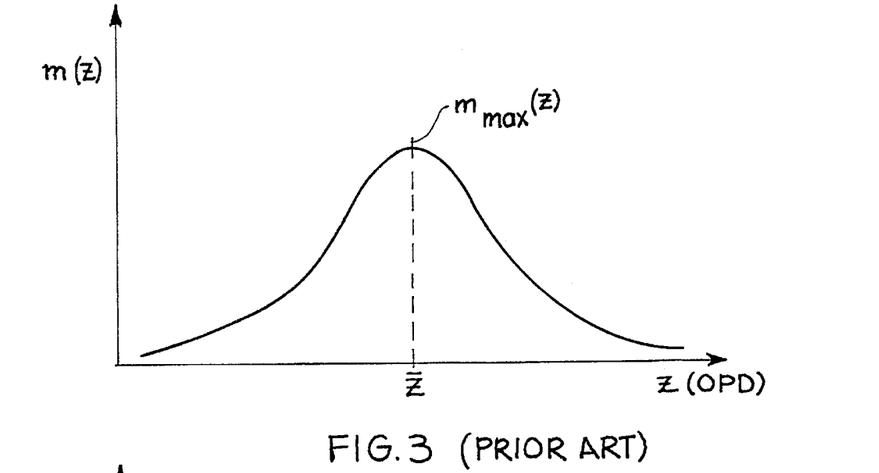
FIG. 3 is an illustration of the amplitude modulation signal corresponding to the irradiance shown in FIG. 2.

It is known that the modulation signal $m(z)$ approximates a bell-shaped function of the type illustrated in FIG. 3; therefore, the peak of the function $m(z)$ corresponds to the maximum fringe visibility produced by the interferometer and to the scanning position z which is the target of the measurement. Note that the curve illustrated in FIG. 3 also corresponds to the upper envelope of the irradiance function of FIG. 2, shown in dotted line in that figure.

The peak of the modulation curve m(z) cannot be determined directly from the modulated carrier signals because these are not individually-measurable quantities and are not readily available from irradiance information. Therefore, all prior-art procedures utilize some form of the relationship of Equation 1 to estimate the peak of the modulation function m(z) from VSI light-intensity measurements and generate a corresponding height for the surface of the test sample S.

Several approaches have been developed for white-light scanning interferometry. For instance, see Caber, P. et al., "A New Interferometric Profiler for Smooth and Rough Surfaces," Proc. SPIE, Vol. 2088, 195–203, 1993; Kino, Gordon S. et al., "Mirau Correlation Microscope," Applied Optics, 29(26): 3775–3783, 1990; de Groot, Peter and L. Deck, "Three-Dimensional Imaging by Sub-Nyquist Sampling of White-Light Interferograms," Optics Letters, 18(17): 1462–1464, 1993; Danielson, Bruce L. et al., "Absolute Optical Ranging Using Low Coherence Interferometry," Applied Optics, 30(21): 2975–2979, 1991; Dresel, Thomas et al., "Three-Dimensional Sensing of Rough Surfaces by Coherence Radar," Applied Optics, 31(7): 919–925, 1992; and Davidson, Mark et al., "First Results of a Product Utilizing Coherence Probe Imaging for Wafer Inspection," SPIE Vol. 921, 100–114, 1988.

All of these publications describe elaborate approaches for determining the peak of the modulation function m(z) (Equation 1) from irradiance data I(z), deriving surface topography information from extensive processing of light intensity signals based on a determination of the OPD corresponding to the peak of the modulation curve illustrated in FIG. 3. In essence, they all strive to find the z value corresponding to the peak of m(z) by estimating the shape of the modulation envelope itself through a sequence of elaborate transformations and calculations. These processing steps require substantial electronic hardware dedicated to processing the light intensity signals produced by the interferometer in order to generate on-line height data corresponding to the peak of the modulation function envelope. Alternatively, in order to reduce hardware requirements and manufacturing costs, prior art apparatus and methods have also taken the approach of storing the irradiance signals in a memory on-line during scanning and subsequently processing the stored information by means of computer software. A typical computer-processing time for estimating the peak of the modulation function m(z) and for calculating the corresponding z utilizing these prior-art procedures is in the order of 10 seconds. Thus, the software approach reduces hardware costs but introduces a material delay in the availability of profiling results, which is very undesirable for on-line applications, such a when VSI is used for manufacturing quality control. Therefore, any faster and less hardware-dependent technique for determining height data from irradiance measurements would represent a valuable improvement in the art.

Figure 4:
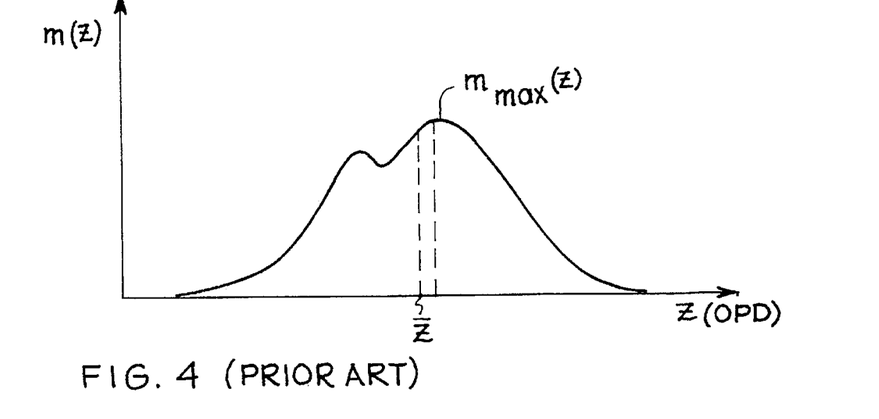
FIG. 4 is an illustration of an amplitude modulation curve exhibiting multiple peaks.

All prior-art techniques suffer from another drawback. In practice, depending on the roughness characteristics of the test surface and the scanning conditions, the modulation function m(z) is not always uniformly bell-shaped; rather, it usually exhibits multiple maxima that hinder a repetitive estimation of the peak corresponding to maximum fringe visibility. FIG. 4 is an illustration of such a modulation curve. In such cases it is difficult to distinguish one peak from another and no prior-art procedure provides an effective method for consistently selecting the same peak as the point corresponding to maximum fringe visibility. Therefore, inconsistent results are often obtained from rough interpixel surfaces. Similar modulation curves and results are also seen from inertial overshooting produced by very rapid motion during scanning.

As those skilled in the art readily understand, for the purpose of producing height data from VSI procedures it is not absolutely necessary to locate exactly the true peak of the modulation curve m(z), so long as the measured value of z is close to the z corresponding to the peak and its value can be obtained repetitively during a scanning operation. Therefore, the problem with the inability of prior-art procedures to consistently select the same peak when dealing with multi-maxima modulation curves lies in its lack of repeatability (or consistence of results), rather than in the actual deviation from the correct z value. Since vertical scanning produces relative positions, z values corresponding to off-peak modulations are acceptable so long as consistently repeatable. Therefore, any VSI technique that improved the repeatability of modulation-peak estimation would also be a very desirable improvement over the prior art.

This shortcoming of prior-art techniques in dealing with multi-peak modulation envelopes is particularly evident in measuring topographies with sharp, large steps occurring within a single pixel or a small number of adjacent pixels. When such profiles are scanned, the resulting irradiance signals tend to produce modulation envelopes with two distinct maxima (of the type shown in FIG. 4). This effect is believed to result from the high level of light scattering associated with sharp changes of elevation in the surface profile. In these situations, prior-art techniques seeking to determine a maximum point on the modulation envelope are inherently subjected to ambiguities that produce artifacts. This is particularly a problem in applications that require the ability to accurately measure sharp steps in the profile of a surface. It is noted, though, that the problem is not unique to the measurement of sharp steps, but it occurs whenever a surface contains significant interpixel variations, such as in the order of 10 nanometers or greater. This invention is directed at providing an approach that also improves prior-art techniques with respect to these problems.

BRIEF SUMMARY OF THE INVENTION

One primary goal of this invention is a method that requires simpler processing circuitry than the prior art and therefore reduces hardware costs for surface-profiler manufacture.

Another basic objective is a technique that requires fewer processing steps and that, therefore, is faster and more efficient for on-line applications.

Another objective is a method for generating a surface-height profile from interferometric irradiance signals that reduces the artifacts produced by prior-art techniques when measuring rough surfaces.

Still another important goal of the invention is a method that reduces the artifacts produced by prior-art techniques when measuring relatively large, sharp steps.

Another goal is a technique that is consistently repeatable and not subject to ambiguities when applied to modulation functions with multiple peaks.

Finally, another objective is a method and apparatus that are suitable for direct incorporation with existing interferometric surface profilers.

Therefore, according to these and other objectives, the present invention consists of a broad-bandwidth interferometric system that produces irradiance signals at multiple vertical-scanning positions as a function of optical path differences between a test and a reference surface. The effective peak of the envelope defined by the modulation component of the irradiance signal is estimated by finding the scanning position corresponding to the centroid of a function substantially equal to the square of the first-order derivative of the measured irradiance. The surface height at each pixel is determined directly from digital irradiance signals, thereby greatly reducing the data-processing steps and associated costs taught by the prior art and correspondingly simplifying the hardware requirements of the system for rapid on-line display of height measurements. The approach is free of the ambiguities inherent in multi-peak modulation functions, thereby producing surface maps with reduced artifacts. This improved technique produces results otherwise comparable with those obtained by standard techniques and requires no dedicated hardware for rapid on-line applications.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

This invention utilizes an idea developed for space-domain white-light interferometry to solve the above-mentioned problems attendant to time-domain prior-art techniques. It has been shown that the center position of a white-light fringe signal can be successfully estimated by calculating the center of gravity of the irradiance signal curve. See Dandliker et al., "Electronically Scanned White-Light Interferometry: a Novel Noise-Resistant Signal Processing," Optics Letters, 17(9): 679–681, 1992. In that article, the authors describe a method for measuring changes within optical fibers as a result of stresses applied to the fibers that alter the index of refraction for s and p polarized light. They effect space-domain interferometric measurements by operating directly on irradiance data, rather than on a demodulated signal.

We recognized that this procedure applied to time-domain interferometric scanning provides a vehicle for improving the problems enumerated above. The idea of using a center-of-mass approach to estimating the z value corresponding to the peak of the modulation function m(z) makes it possible to avoid the problem of uncertainty associated with multi-peak functions. In addition, and most importantly, since light intensity signals can be used directly to calculate the optical path difference corresponding to maximum fringe visibility, the signal-processing steps are greatly simplified and permit more rapid on-line display of a surface topography with less expensive hardware.

As mentioned above, in order to obtain accurate height measurements by VSI, it is not necessary to locate exactly the peak of the modulation curve m(z) so long as the measured value of z is close to the z corresponding to the peak and its value can be obtained repetitively. Modulation functions m(z) are substantially bell-shaped; therefore, their centroid is naturally close to and can be used to estimate the z value corresponding to the effective peak of the envelope, even when multiple peaks are present. In addition, and most importantly, the centroid is a unique quantity, thereby preventing the uncertainty that is otherwise present when a multi-peak modulation curve is involved. When pixel measurements are made, the modulation envelope for a given pixel often has two peaks because different-height regions of the pixel contribute a fringe to the same camera pixel. Thus, a pixel value representing the influence of all regions within the pixel would be more representative of the pixel's height and, therefore, more desirable. The centroid method of the present invention achieves such a result.

In testing the approach disclosed by Dandliker for time-domain applications, we discovered that approximately quadratic functions of the first-order derivative of the irradiance signal measured during VSI have an approximately-symmetrical, converging functionality with substantially the same centroid as the modulation envelope m(z). Accordingly, rather than manipulating irradiance signals to locate the peak of the modulation curve m(z) by complex processing of the signals detected during scanning, as done in prior-art procedures, this method simply calculates the center of mass, or centroid, of a predetermined function of I'(z) as a means for estimating the z location of maximum fringe contrast. Other functions of I(z) have also been found to be suitable for direct signal processing using the center of gravity approach, as detailed below.

Thus, the irradiance signals I(z) can be advantageously used directly to estimate the centroid of the modulation function m(z) by finding the centroid z of an approximately-quadratic function f[I'(z)] of the first-order derivative of the measured irradiance. We found that such value of z is equivalent to the centroid of the modulation function m(z), thereby also making it possible to directly find the z related to maximum visibility. Therefore, rather than manipulating irradiance signals to locate the peak of the modulation curve m(z) by complex processing of the modulated carrier signal detected during scanning, as done in prior-art procedures, the method of this invention simply calculates the center of mass, or centroid, of a predetermined function of I(z) or I'(z) as a means for estimating the z location of maximum fringe contrast.

As in the case of m(z), the function f[I'(z)] has a converging envelope; therefore, it has a centroid that can be readily calculated from scanning data. For the purpose of this specification, a converging functionality is defined as one where the value of the function is always positive; the function has an envelope that increases from substantially zero to an absolute maximum and decreases to substantially zero; and has a centroid value consistently representative of the maximum's abscissa (that is, any offset between the two is consistently repeated during scanning). For example, any approximately bell-shaped curve, even if subjected to a modulated carrier, would fall within this definition.

In general, for any symmetrical, perfectly bell-shaped function f(z) for which n discrete measurements have been taken at n values of z during scanning, the vertical position z corresponding to the peak of such bell-shaped function f(z) would also be the centroid of the function and could be found from the general relationship $$z = \frac{\Sigma[zf(z)]}{\Sigma f(z)} \quad (2)$$

To the extent that in practice the function f(z) may not be perfectly symmetrical, z will differ from the abscissa of its peak, but it will reflect a shift that is consistently repeated during measurements so long as the shape of the curve remains substantially unchanged, thereby providing a perfect measure of relative translation during scanning.

Figure 5:
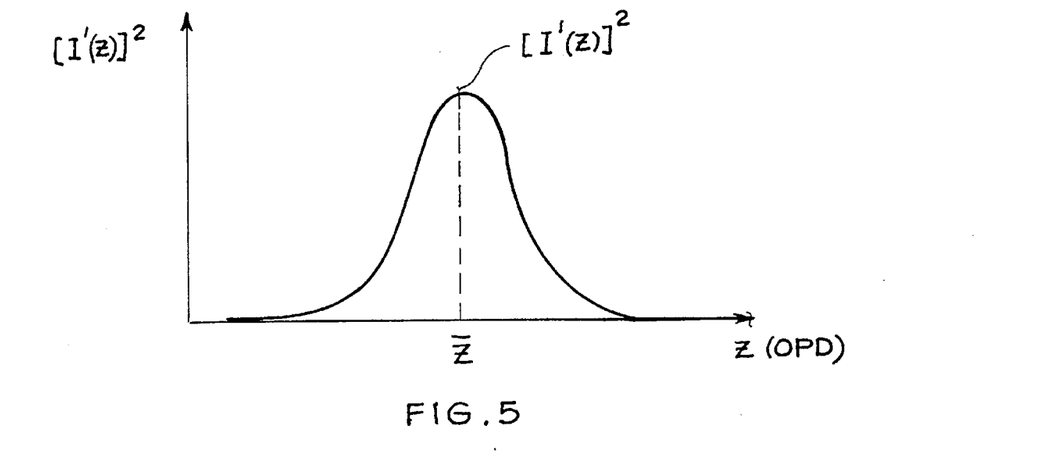
FIG. 5 is an illustration of an approximately bell-shaped curve representing the function $[I'(z)]^2$.

Therefore, taking advantage of the fact that approximately quadratic functions of the first-order derivative of the irradiance signal are converging functions (as herein defined) with a centroid that is repetitively close to the z value of the peak of the corresponding modulation function, such approximately quadratic functions can be utilized directly for processing irradiance signals and calculating the height profile of a test surface produced by VSI. In its simplest form, we found that $f[(I'(z)]=[I'(z)]^2$ is a converging function of z with a centroid z repetitively near that of m(z), as illustrated in FIG. 5. Therefore, in general a good estimate of the value of z corresponding to the peak of the modulation function m(z) can be calculated from n scanning measurements for each pixel by the following equation:

$$z = \frac{\Sigma\{z[I'(z)]^2\}}{\Sigma[I'(z)]^2} \quad (3)$$

where each I'(z) is a first-order derivative of the irradiance signals generated during n scanning steps along the vertical coordinate z at each pixel.

Figure 6:
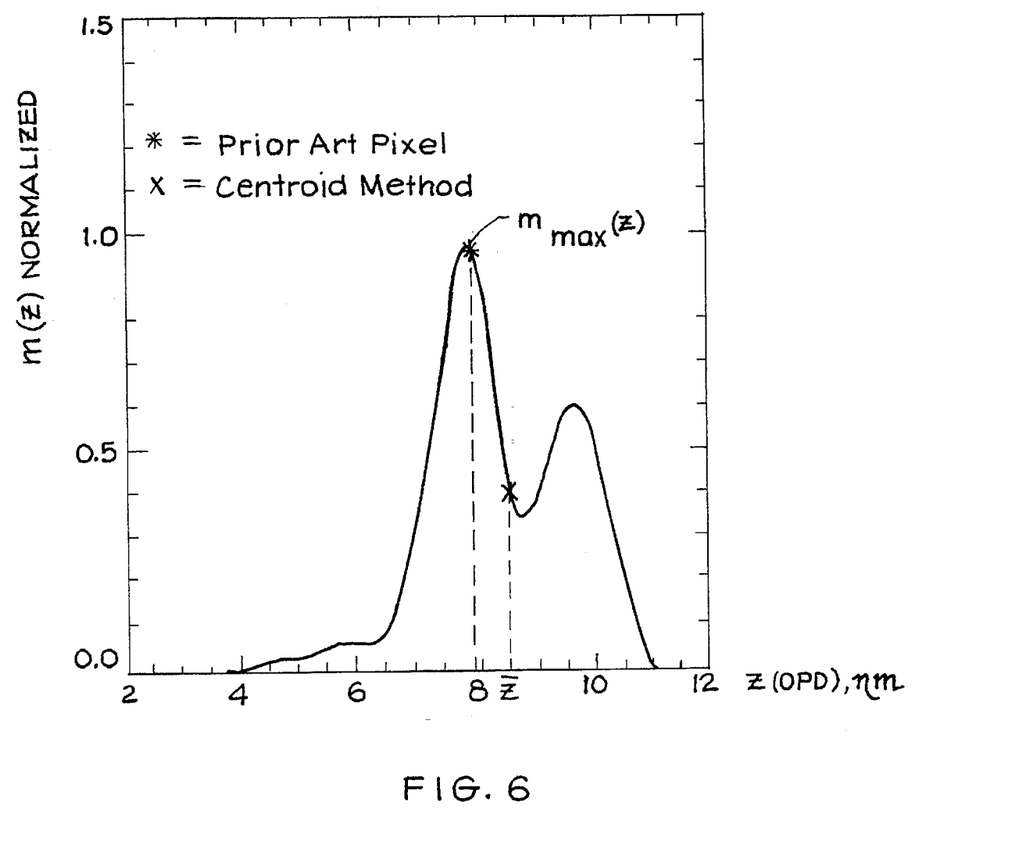
FIG. 6 is an illustration of the z value calculated by the centroid method of the invention for a two-peak modulation envelope.

Note that Equation 3 can be used effectively to produce the height profile of a test surface by VSI even if the calculated z does not correspond to $m_{max}(z)$. As explained above, the precision and repeatability of relative scanning positions is more important for good results than the precise position corresponding to maximum fringe visibility. Therefore, all artifacts introduced by the uncertainty associated with multi-peak modulation envelopes are reduced and measurements of rough surfaces and of large, steep-step profiles are improved. FIG. 6 illustrates the z value calculated by the centroid method of the invention and by a prior-art method for a sample pixel having a two-peak modulation envelope.

Figure 7:
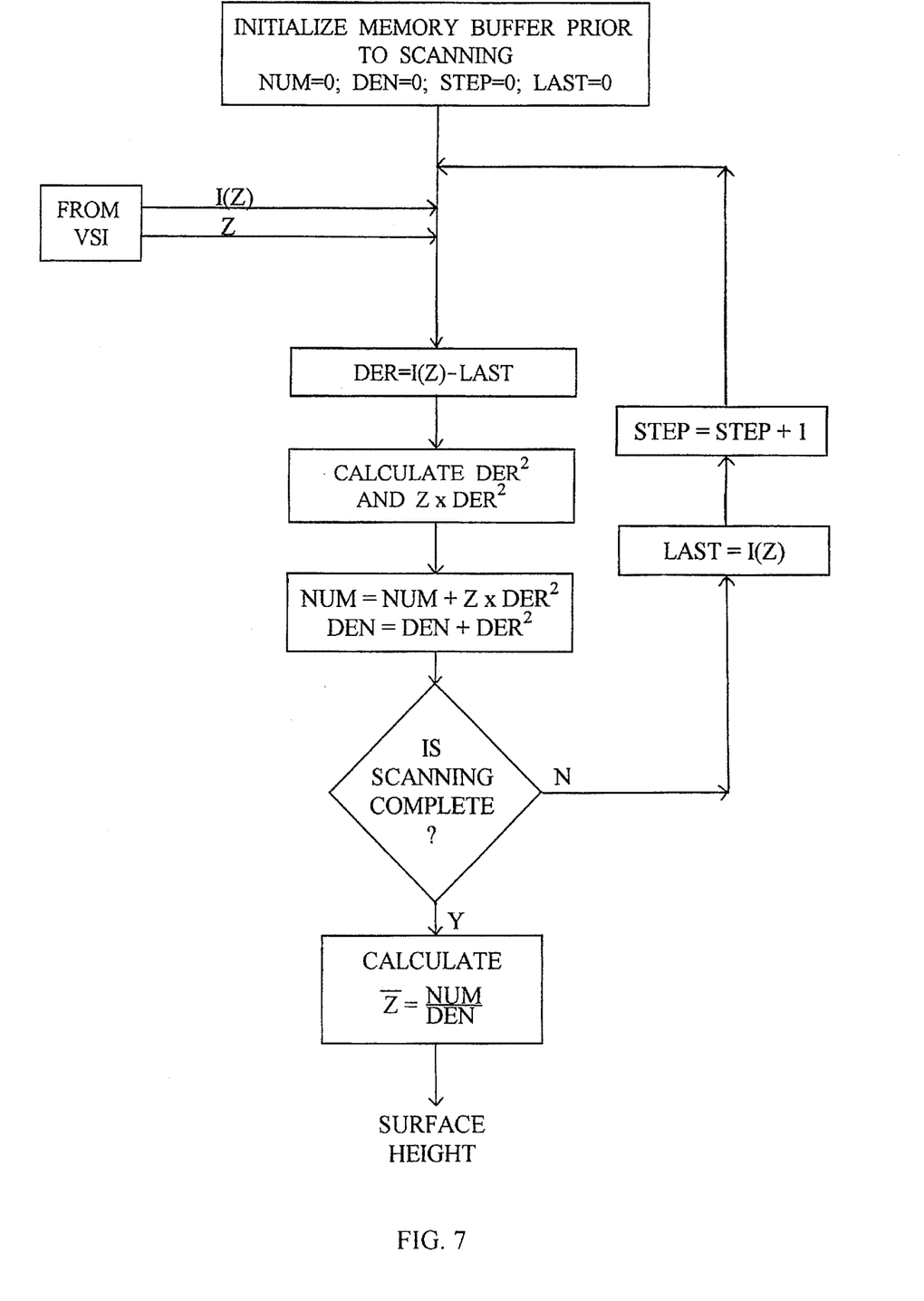
FIG. 7 is a block diagram of the simplified procedure of the present invention.

In practice, I'(z) is preferably determined by maintaining a constant scanning step $\Delta z$ and calculating $I(z)-I(z-\Delta z)$, where z and $z-\Delta z$ correspond to successive scanning steps in the time domain. From Equation 3 it is possible to calculate the value of z corresponding to maximum visibility simply by calculating and storing $[I'(z)]^2$ and $z[I'(z)]^2$ as irradiance signals I(z) are generated for each successive value of z and by updating each memory entry at every time step by adding the new data to the cumulative sum of all prior entries. After scanning is completed, $\Sigma\{z[I'(z)]^2\}$ is divided by $\Sigma[I'(z)]^2$ to immediately produce the desired centroid, or relative height value, z. The procedure is illustrated in the block diagram of FIG. 7.

Note that one of the bases for this invention is also the realization that the particular functionality of I(z) (Equation 1) allows several transformations that produce converging curves with a centroid useful for estimating the peak of the irradiance modulation function m(z). For example, by subtracting the bias term $I_o$ from I(z) in Equation 1 and taking the absolute value of the sinusoidal component of I(z), the resulting quantity m(z) $\cos(\omega_o z+\alpha)$ is necessarily also a converging curve and its centroid z is the same as that of m(z). The same result can be obtained by subtracting the bias term $I_o$ and by elevating the remainder (or its sinusoidal component) to an even power (as disclosed by Dandliker et al.). Similarly, any operation on that remainder that consists of a combination of exponential and absolute-value components that yield a positive functionality over the scanning range would be expected to be suitable for estimating z values corresponding to maximum-fringe visibility according to the invention. In practice we found that even powers of the derivative I'(z), the second power being most preferred, provide excellent vehicles to estimate the scanning position corresponding to maximum fringe visibility.

In operation, at each scanning-height coordinate z, the values of $f[I'(z)]$ and $zf[I'(z)]$ are calculated and added to a cumulative memory to keep track of $\Sigma f[I'(z)]$ and $\Sigma\{zf[I'(z)]\}$ on-line during the scanning operation. When scanning is completed, the value of the centroid z for the function $f[I'(z)]$ is thus immediately available by dividing $\Sigma\{zf[I'(z)]\}$ by $\Sigma f[I'(z)]$, which produces the z coordinate corresponding to the surface height at the pixel being scanned. By measuring the irradiance in all pixels at each scanning step, VSI is performed in parallel for all pixels of the test surface and a complete topographic map can be generated substantially on-line immediately after scanning. No dedicated electronic hardware is required, other than the standard processing hardware used to control the interferometer and display the height profile of the test surface.

Figure 8:
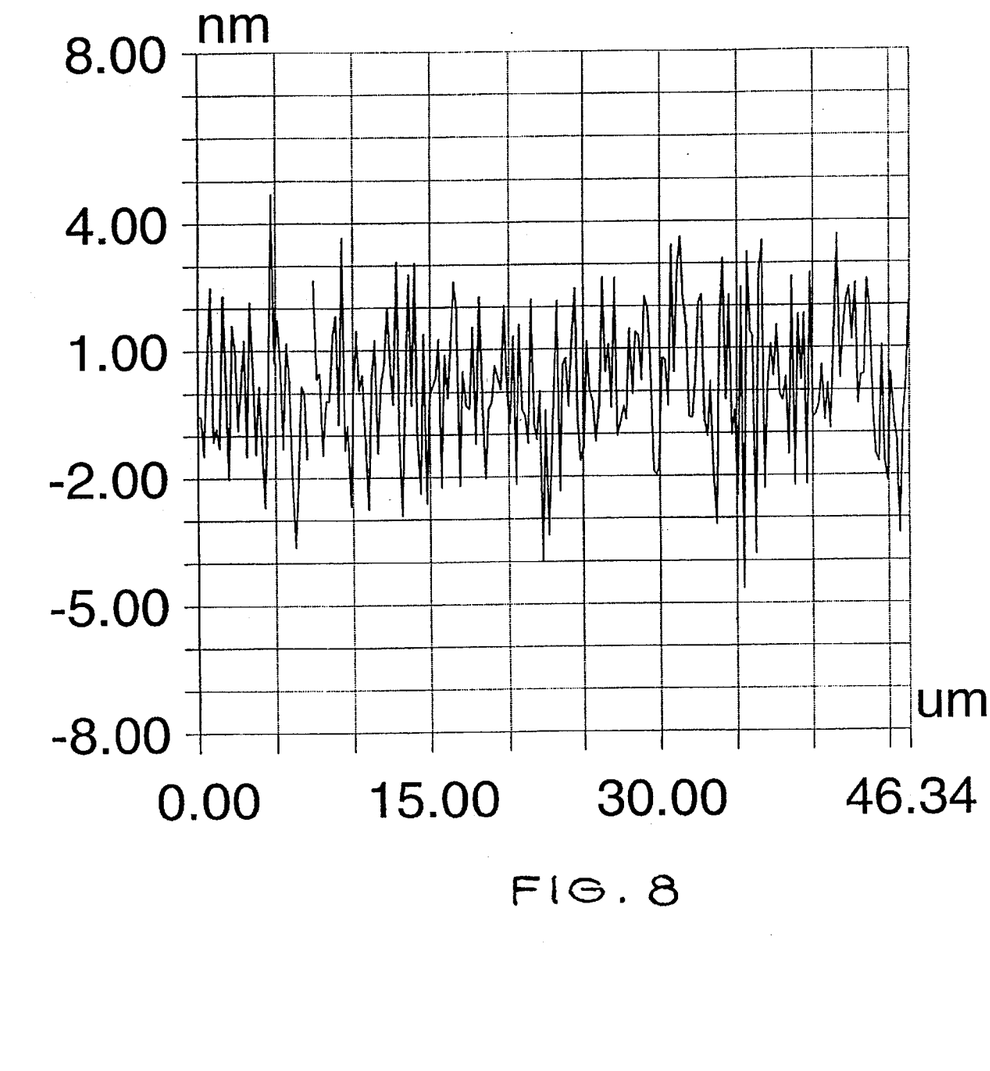
FIG. 8 shows a height profile of a smooth test surface generated on-line using the procedure of the invention.
Figure 9:
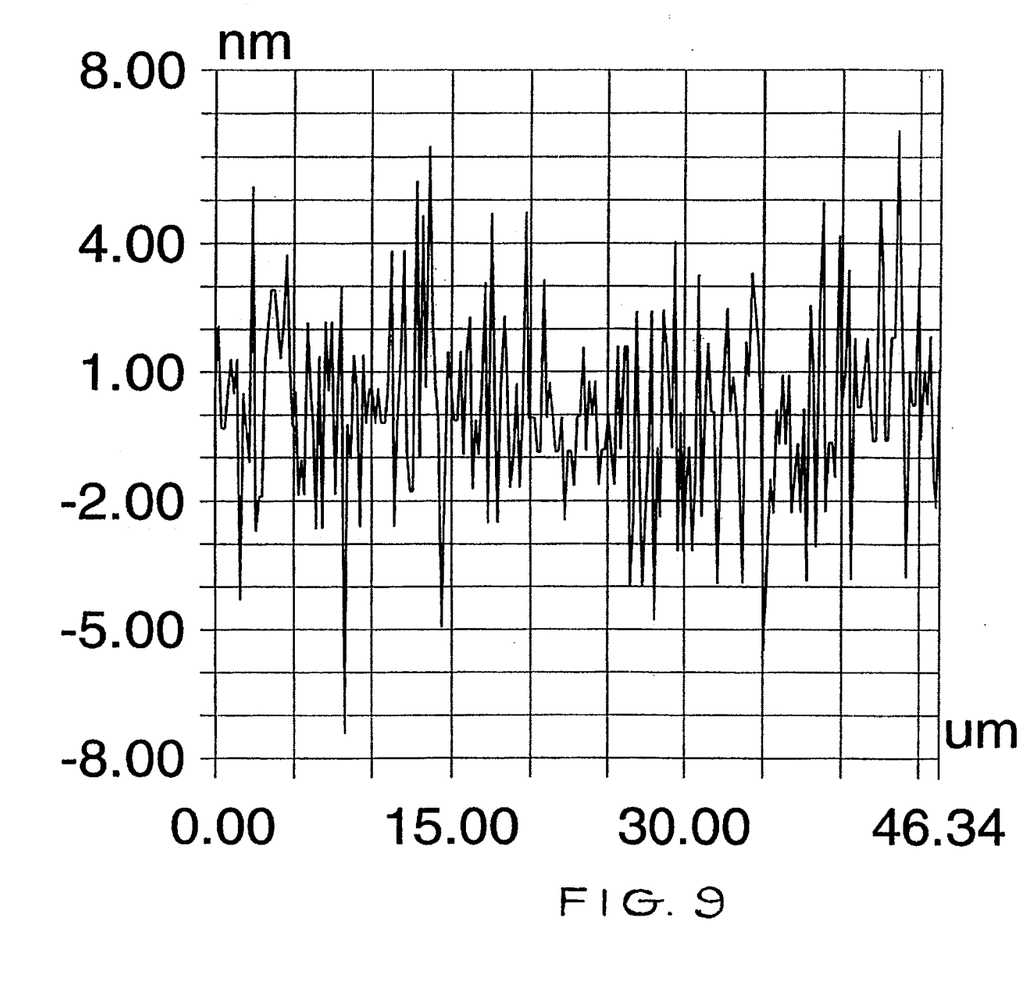
FIG. 9 shows a profile generated by a prior-art procedure based on the same irradiance signals used to produce the profile of FIG. 8.

As mentioned, best results were achieved by setting $f[I'(z)]=[I'(z)]^2$. For comparison with prior-art results, FIG. 8 shows a height profile of a very smooth test surface (a smooth mirror, with roughness of less than 1 nm) generated on-line using this function in the procedure of the invention; FIG. 9 shows a profile generated by the same irradiance signals using a prior-art method. Because of the smoothness of the surface, the measured spikes correspond to noise, rather than actual height variations. While both techniques yielded acceptable results, it is apparent that the method of the invention produced a noise reduction. In general, we found that the centroid method reduces noise by about 20%. Therefore, the technique of the present invention provides a simplified, significantly faster, and less expensive procedure for determining surface heights from VRI measurements.

We investigated various other functional forms for f[I(z)] and f[I'(z)], but found that the quality of the results deteriorates for relationships that are not at least approximately second-degree functions of the first-order derivative of I(z). For example, we set $f[I'(z)]=[I'(z)]^m$ and tested the procedure of the invention for m=1, 1.5, 2, 2.5, 3, 3.5 and 4, using Equation 3. We produced height profiles for each value of m and compared them with profiles generated by prior-art techniques. We found that only values of m between 1 and 2 yielded consistently comparable and repeatable results. (Note that in practice absolute values of I'(z) were used in testing non-even-exponent functionalities to avoid complex number calculations.) Although theoretically comparable, we found that exponents greater than two tend to greatly amplify system noise, rendering them less desirable in practice. Table 1 below illustrates the results obtained by comparing the rms heights for a given test-surface pixel produced by estimating the peak of the modulation function m(z) (prior art) versus the centroid of $[\Gamma'(z)]^m$ for various values of m. Note that the measured height values were normalized with reference to a pixel's true height of zero.

TABLE 1

| Test Function | Calculated RMS Height at Selected Pixel, nm |
| --- | --- |
| m(z) (prior art) | $1.880\,e^{-4}$ |
| $\Gamma'(z)$ | $2.584\,e^{-4}$ |
| $[\Gamma'(z)]^{1.5}$ | $2.384\,e^{-4}$ |
| $[\Gamma'(z)]^2$ | $2.082\,e^{-4}$ |
| $[\Gamma'(z)]^{2.5}$ | $3.192\,e^{-4}$ |
| $[\Gamma'(z)]^{3.0}$ | $3.651\,e^{-4}$ |
| $[\Gamma'(z)]^{3.5}$ | $4.161\,e^{-4}$ |
| $[\Gamma'(z)]^{4.0}$ | $4.689\,e^{-4}$ |

In view of these results, $[\Gamma'(z)]^2$ is the preferred functionality for practicing the concept of the present invention. As those skilled in the art would readily understand, other second degree, or approximately second degree, functions of $\Gamma'(z)$, such as polynomial combinations, would be expected to yield equivalent results, but $[\Gamma'(z)]^2$ is the simplest and most direct form available for this application.

Thus, the present invention exploits time-domain analysis advantageously to precisely measure the three-dimensional surface topography of a test sample. The calculations of surface height are performed entirely in the time domain according to principles previously known only in the context of one-dimensional space-domain measurements of optical fibers.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. An interferometric profiling method wherein time-domain interferometric measurements are performed by illuminating though a microscope objective a test surface and a reference surface aligned in an optical path and by scanning in time each of a plurality of predetermined adjacent regions of the test surface to provide an interference pattern detected on a corresponding plurality of regions of a photosensitive surface, said method comprising the following steps:

(a) using a broad-bandwidth light source to illuminate the test surface and the reference surface while effecting a multi-step relative translation therebetween to produce a plurality of interference patterns and a corresponding plurality of irradiance signals on said photosensitive surface, such that an irradiance signal for each of said adjacent regions of the test surface is generated for a predetermined scanning position at each step of said relative translation and detected at said corresponding regions of the photosensitive surface;

(b) estimating a relative-translation position corresponding to a peak value of a modulation function associated with said irradiance signal for each of said adjacent regions of the test surface; and (c) processing said relative-translation position to produce a topographic map of said test surface for on-line display;

wherein said step (b) comprises the step of calculating a centroid value for a predetermined converging function of a first-order derivative of said irradiance signal and using said centroid value as a relative-translation position corresponding to a peak value of said modulation function.

2. The method of claim 1, wherein said first-order derivative of said irradiance signal is taken to the $m^{th}$ power, wherein $1<m<2$.

3. The method of claim 2, wherein m is approximately equal to 2.

4. The method of claim 3, wherein said first-order derivative is approximated by the difference between irradiance signals at successive steps during said multi-step relative translation.

5. The method of claim 2, wherein said first-order derivative is approximated by the difference between irradiance signals at successive steps during said multi-step relative translation.

6. The method of claim 1, wherein said converging function comprises an absolute value of a substantially sinusoidal component of said first-order derivative of the irradiance signal.

7. The method of claim 6, wherein said absolute value is taken to the $m^{th}$ power, wherein $1<m<2$.

8. The method of claim 6, wherein said first-order derivative is approximated by the difference between irradiance signals at successive steps during said multi-step relative translation.

9. The method of claim 6, wherein m is approximately equal to 2.

10. The method of claim 9, wherein said first-order derivative is approximated by the difference between irradiance signals at successive steps during said multi-step relative translation.

11. The method of claim 1, wherein said first-order derivative is approximated by the difference between irradiance signals at successive steps during said multi-step relative translation.

12. The method of claim 1, wherein said centroid is determined as follows:

at each step of said relative translation, calculating a step function-value for a predetermined converging function of a first-order derivative of said irradiance signal and adding said step function-value to a cumulative function-value stored in a function-value memory; multiplying said step function-value by a position value corresponding to said predetermined scanning position and adding a resulting step product-value to a cumulative product-value stored in a product-value memory; and at the end of said relative translation, dividing said cumulative product-value stored in the product-value memory by said cumulative function-value stored in the function-value memory to produce a centroid value for said converging function, said centroid value corresponding to a relative-translation position producing a maximum irradiance at said predetermined region of the photosensitive surface.

13. The method of claim 12, wherein said converging function comprises a first-order derivative of said irradiance signal taken to the $m^{th}$ power, wherein $1<m<2$.

14. The method of claim 13, wherein m is approximately equal to 2.

15. The method of claim 14, wherein said first-order derivative is approximated by the difference between irradiance signals at successive steps during said multi-step relative translation.

16. The method of claim 13, wherein said first-order derivative is approximated by the difference between irradiance signals at successive steps during said multi-step relative translation.

17. The method of claim 12, wherein said first-order derivative is approximated by the difference between irradiance signals at successive steps during said multi-step relative translation.

* * * * *